(12) United States Patent
Joki

(10) Patent No.: US 9,121,508 B2
(45) Date of Patent: Sep. 1, 2015

(54) FLOW CONTROL FOR LARGE DIAMETER CONDUITS

(75) Inventor: Glen Joki, Lloydminster (CA)

(73) Assignee: 1075878 Alberta Ltd., Lloydminster, Alberta (CA)

( * ) Notice: Subject to any disclaimer, the term of this patent is extended or adjusted under 35 U.S.C. 154(b) by 0 days.

(21) Appl. No.: 14/122,015

(22) PCT Filed: May 31, 2011

(86) PCT No.: PCT/CA2011/000615
§ 371 (c)(1),
(2), (4) Date: Nov. 25, 2013

(87) PCT Pub. No.: WO2012/162780
PCT Pub. Date: Dec. 6, 2012

(65) Prior Publication Data
US 2014/0083546 A1    Mar. 27, 2014

(51) Int. Cl.
| F16L 55/10 | (2006.01) |
| G05D 7/01 | (2006.01) |
| F16K 3/02 | (2006.01) |
| F16K 3/312 | (2006.01) |
| F16L 55/105 | (2006.01) |

(52) U.S. Cl.
CPC ............... *F16K 3/029* (2013.01); *F16K 3/312* (2013.01); *F16L 55/105* (2013.01)

(58) Field of Classification Search
USPC ............................................. 138/45, 94, 94.3
See application file for complete search history.

(56) References Cited

U.S. PATENT DOCUMENTS

| 1,112,066 | A | * | 9/1914 | Hollis .......................... 48/189.4 |
| 2,029,151 | A | | 1/1936 | Bigelow |
| 2,242,467 | A | | 5/1941 | Hamer |
| 2,271,282 | A | * | 1/1942 | Young .......................... 138/94.3 |
| 2,309,304 | A | * | 1/1943 | Creighton ..................... 138/94.3 |
| 2,339,970 | A | * | 1/1944 | Young .......................... 138/94.3 |
| 2,354,967 | A | * | 8/1944 | Perry ............................ 138/94.3 |
| 2,455,120 | A | * | 11/1948 | Hamer ............................. 138/44 |
| 2,462,493 | A | * | 2/1949 | Hamer ............................. 138/44 |
| 2,709,455 | A | * | 5/1955 | Greenwood ................. 138/94.3 |
| 3,695,299 | A | * | 10/1972 | Rodgers ....................... 138/94.3 |
| 4,452,278 | A | * | 6/1984 | Quinn .......................... 138/94.3 |
| 5,303,740 | A | * | 4/1994 | Junier .............................. 138/44 |
| 7,017,886 | B1 | * | 3/2006 | Ngene-Igwe ................. 251/326 |
| 7,731,242 | B2 | * | 6/2010 | Coscarella .................... 285/236 |
| 7,841,365 | B2 | | 11/2010 | Vetter |
| 2003/0056843 | A1 | * | 3/2003 | Carey .......................... 138/94.3 |

FOREIGN PATENT DOCUMENTS

| CN | 2353974 Y | 12/1999 |
| CN | 2833277 Y | 11/2006 |
| KR | 20100069895 A | 6/2010 |

* cited by examiner

*Primary Examiner* — Paul R Durand
*Assistant Examiner* — Vishal Pancholi
(74) *Attorney, Agent, or Firm* — Patterson Thuente Pedersen, P.A.

(57) ABSTRACT

A slide blind controls flow through conduits at a flanged connection. The slide blind has a right and left working plates configured such that one of the working plates is sealed between the flanges a perimeter thereof adjacent to inner sides of the flange bolts. A joiner member connects the right and left working plates, and handle members extend in right and left directions from the corresponding working plates. The joiner and handle members have a thickness less than the thickness of the right and left working plates. The handle members and the joiner member define first and second sets of bolt holes to fasten the slide blind with either the right or left working plate between the flanges. The joiner and handle members are significantly lighter weight than the working plates, and can be removed for convenient transport.

4 Claims, 3 Drawing Sheets

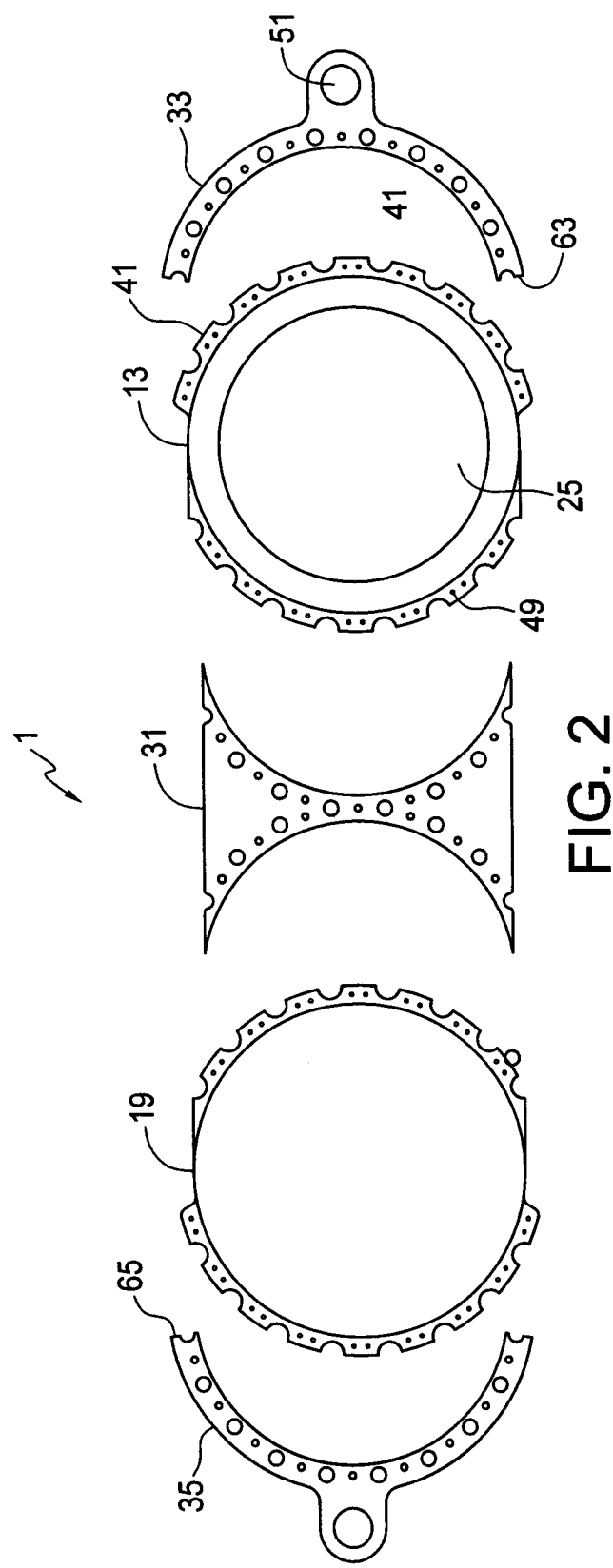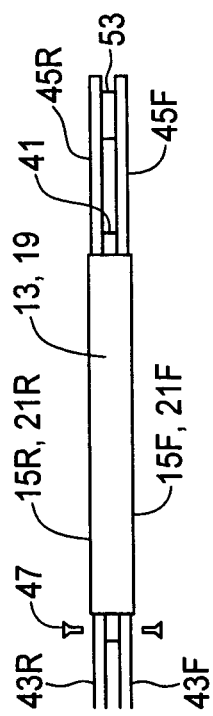

FLOW CONTROL FOR LARGE DIAMETER CONDUITS

RELATED APPLICATIONS

The present application is a National Phase entry of PCT Application No. PCT/FR2011/050227, filed Feb. 4, 2011, which claims priority from FR Application No. 10 58956 filed Oct. 29, 2010, which applications are incorporated by reference herein in their entirety.

This invention relates to pipes, conduits, and the like and in particular to an apparatus for controlling flow through a conduit by blocking or restricting the flow.

Networks of conduits are found in many industrial applications. While it is common to provide a valve to control flow through a conduit, it is sometimes required to completely isolate pipes, tanks, or like equipment for cleaning, maintenance, modification, and so forth. For safety reasons a blind plate is provided, commonly at a flanged connection and secured in position to completely block off the conduit and prevent the passage of fluid, either liquid or gas as the case may be, therethrough. In a simple blind plate device, a flanged connection is opened sufficiently, by removing the required number of bolts and prying the flanges apart if necessary, to allow a blind plate to be placed between the two flanges. The bolts are then re-inserted and tightened.

A typical slide blind plate device has a first portion that defines a flow aperture substantially equal in diameter to the conduit, and a second portion that is solid and blocks flow through the conduit. Thus it is readily apparent on viewing the flanged connection with the slide blind plate installed whether the device is oriented such that the conduit is open or closed.

U.S. Pat. No. 2,029,151 to Bigelow and U.S. Pat. No. 7,841,365 to Vetter disclose such a sliding blind plate with first and second sides that can be configured as desired to restrict or block flow.

A problem arises when slide blind plates are used in larger diameter conduits, such as 24 inches, 30 inches, or more as are common in large capacity applications such as petroleum refineries, pipelines, and the like. In order to withstand the forces involved where such a large area is exposed to the pressure of the liquid inside the conduits, the plate are very thick and heavy. For example in a 30 inch diameter pipeline application the slide blind plate could be three inches thick and weigh 2000 pounds or more. In these types of applications, the weight makes it problematic to shift the slide blind plate from one position to the other. The weight and large size of the slide blind plate also makes it cumbersome and costly to transport.

SUMMARY OF THE INVENTION

It is an object of the present invention to provide an apparatus for blocking or restricting flow through a conduit that overcomes problems in the prior art.

The present invention provides a slide blind apparatus for controlling flow through conduits at a flanged connection comprising a front conduit and a front flange mounted to an end thereof, a rear conduit and a rear flange mounted to an end thereof, corresponding flange holes through each of the front and rear flanges, and flange bolts extending through the flange holes operative to draw the front and rear flanges toward each other. The slide blind apparatus comprises a right working plate configured such that front and rear faces of the right working plate are sealed against corresponding front and rear flanges and a perimeter of the right working plate is adjacent to an inner side of the flange bolts when the slide blind apparatus is in a first position. A left working plate is configured such that front and rear faces of the left working plate are sealed against corresponding front and rear flanges and a perimeter of the left working plate is adjacent to an inner side of the flange bolts when the slide blind apparatus is in a second position. A central joiner member is fixed to the right and left working plates, the joiner member having a thickness less than the thickness of the right and left working plates. A right handle member is attached to the right working plate and extends in a direction opposite the joiner member, the right handle member having a thickness less than the thickness of the right and left working plates. A left handle member is attached to the left working plate and extends in a direction opposite the joiner member, the left handle member having a thickness less than the thickness of the right and left working plates. The right handle member and the joiner member define a first set of bolt holes configured such that the flange bolts extend through the flange holes and the first set of bolt holes when the slide blind apparatus is in the first position, and the left handle member and the joiner member define a second set of bolt holes configured such that the flange bolts extend through the flange holes and the second set of bolt holes when the slide blind apparatus is in the second position.

The present invention provides a slide blind apparatus with significantly less weight, contemplated in most applications to be about 25%-40%. The slide blind apparatus of the present invention is thus easier to maneuver, and more convenient and economical to transport than such slide blind devices of the prior art, since the apparatus can be taken apart and packed in smaller lighter packages, and then assembled on site.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 2 is a schematic front view of the embodiment of FIG. 1 with the parts thereof separated;

FIG. 3 is a schematic bottom view of a portion of the slide blind apparatus of FIG. 1 showing the attachment of the joiner and handle members;

DETAILED DESCRIPTION OF THE ILLUSTRATED EMBODIMENTS

Figure 4:
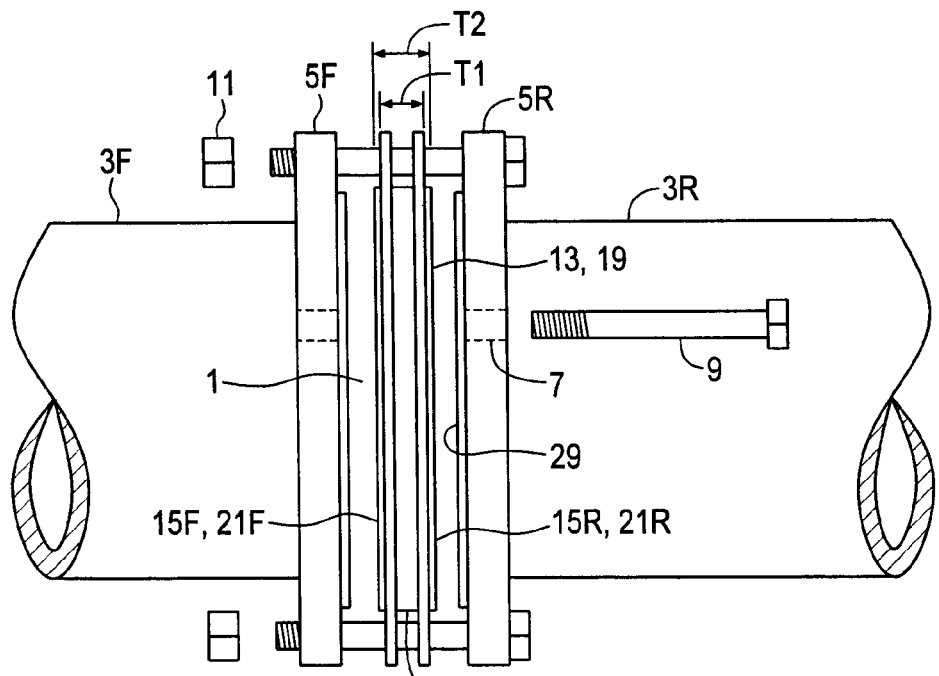
FIG. 4 is a schematic side view of a flanged connection using the embodiment of the slide blind apparatus of FIG. 1, with the flanges of the conduits separated for illustration.

FIGS. 1-6 illustrate an embodiment of a slide blind apparatus 1 of the present invention for controlling flow through conduits at a flanged connection. The flanged connection, as schematically illustrated in FIG. 4, comprises a front conduit 3F and a front flange 5F mounted to an end thereof, a rear conduit 3R and a rear flange 5R mounted to an end thereof. Corresponding flange holes 7 extend through each of the front and rear flanges 5F, 5R, and flange bolts 9 extending through the flange holes 7 and are operative, when nuts 11 are tightened onto the bolts 9, to draw the front and rear flanges 5F, 5R toward each other. The slide blind apparatus 1 is placed between the front and rear flanges 5F 5R.

In this description the terms "front", "rear", "right", "left" are used only for convenience of identification and in practice the conduits 3F, 3R could be in any orientation required by the particular application.

Figure 6:
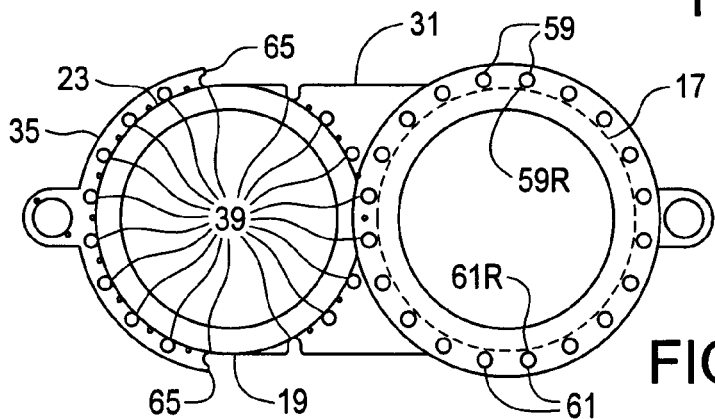
FIG. 6 is a schematic end view of the flanged connection with the slide blind apparatus of FIG. 1 in a first position where the open working member of the apparatus is sealed between the flanges and flow through the connected conduits is open.

The slide blind apparatus 1 comprises a right working plate 13 configured such that front and rear faces 15F, 15R thereof are sealed against corresponding front and rear flanges 5F 5R and a perimeter 17 of the right working plate 13 is adjacent to an inner side of the flange bolts 9 when the slide blind apparatus 1 is in a first position illustrated in FIG. 6.

Figure 5:
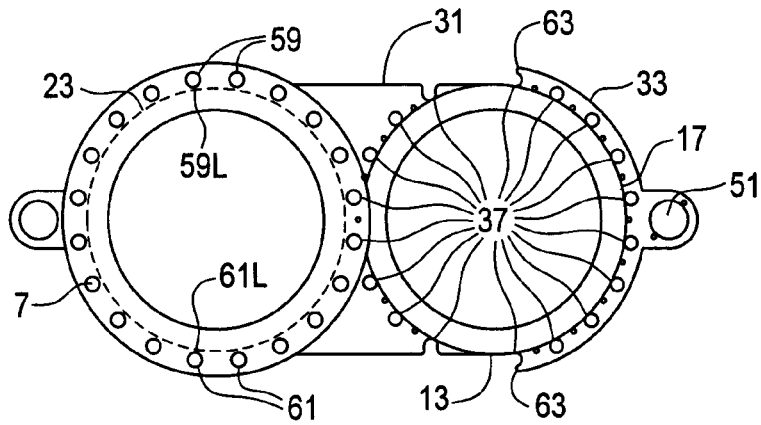
FIG. 5 is a schematic end view of the flanged connection with the slide blind apparatus of FIG. 1 in a second position where the solid working member of the apparatus is sealed between the flanges and flow through the connected conduits is blocked.

A left working plate 19 is configured such that front and rear faces 21F, 21R of the left working plate 19 are sealed against corresponding front and rear flanges 5F, 5R and a perimeter 23 of the left working plate 19 is adjacent to an inner side of the flange bolts 9 when the slide blind apparatus 1 is in a second position illustrated in FIG. 5.

FIG. 4 schematically illustrates a side view of the connection before it is tightened with the slide apparatus 1 in either the first or second position.

Figure 1:
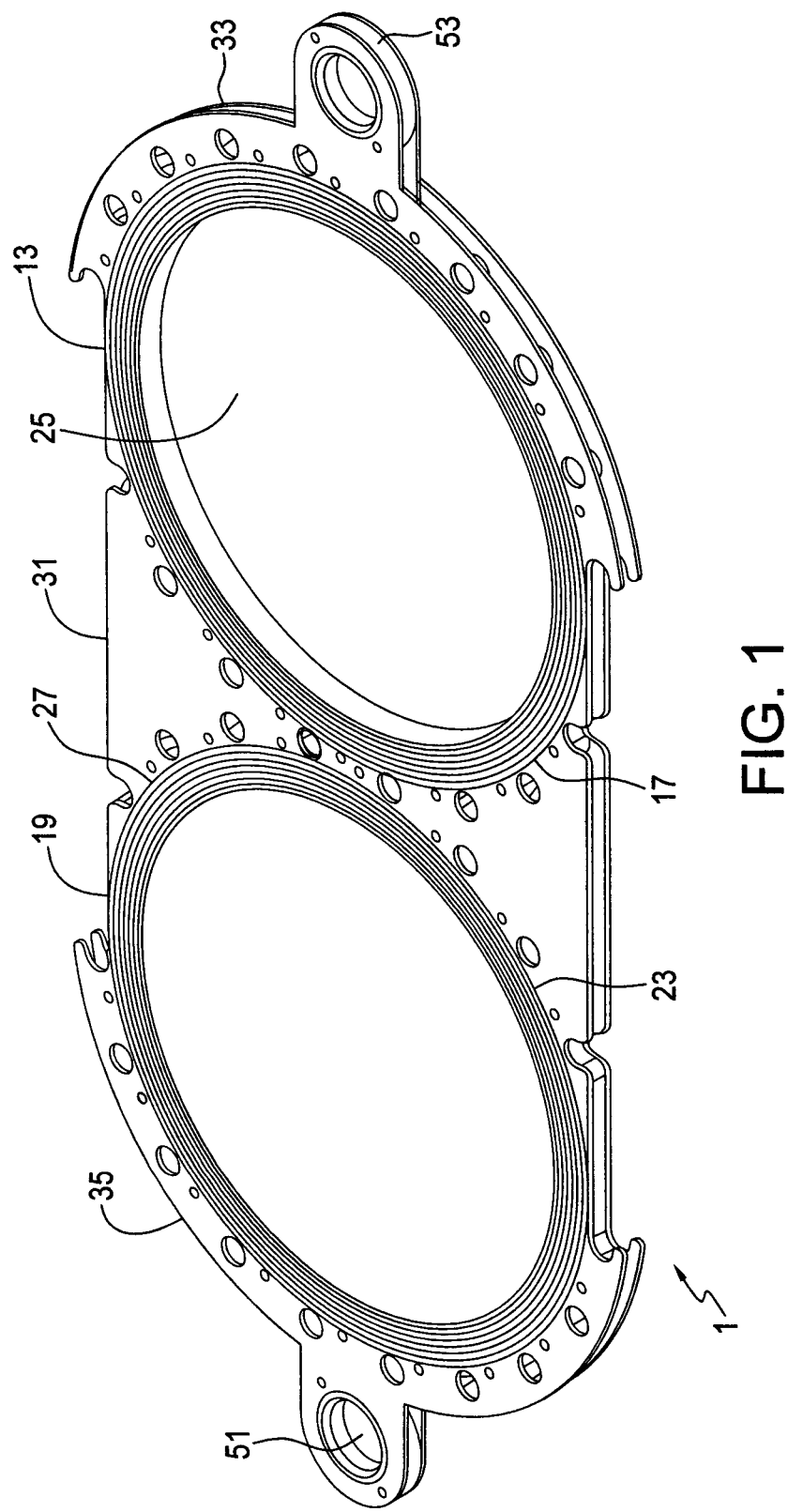
FIG. 1 is a perspective view of an embodiment of a slide blind apparatus of the present invention.

As seen in FIG. 1, the right working plate 13 defines an open flow aperture 25 that is substantially aligned with the front and rear conduits 3F, 3R when the slide blind apparatus 1 is in the first position. Thus when the slide blind apparatus 1 is in the first position full flow is open through the conduits 3F, 3R. The left working plate 19 is solid and blocks flow through the front and rear conduits 3F, 3R when the slide blind apparatus 1 is in the second position.

The right and left working plates 13 and 19 include finished outer portion 27 that is has a surface finished suitable for bearing against a flange seal 29 to seal the connection. The right working plate 13 defines the flow aperture 25 inside the finished outer portion 27 while the left working member 19 is a solid plate inside the finished outer portion 27. It is contemplated that one or the other of the working plates 13, 19 could define other apertures, orifices, and the like that might need to be periodically exchanged.

The right and left working plates 13 and 19 are connected together by a central joiner member 31 fixed to the right and left working plates 13, 19. A right handle member 33 is attached to the right working plate 13 and extends in a direction opposite the joiner member 31, and a left handle member 35 is attached to the left working plate 19 and extends in a direction opposite the joiner member 31. As seen in FIG. 4, the joiner member 31 and right and left handle members 33, 35 have a thickness T1 that is at least somewhat less than the thickness T2 of the right and left working plates 13, 19 so that when the connection is tightened, the flange seals 29 on the faces of the flanges 5F, 5R bear against the finished surfaces 27 of the right and left working members 13, 19.

The right handle member 33 and the joiner member 31 define a first set of bolt holes 37 configured such that the flange bolts 9 extend through the flange holes 7 and the first set of bolt holes 37 when the slide blind apparatus 1 is in the first position of FIG. 6, Similarly the left handle member 35 and the joiner member 31 define a second set of bolt holes 39 configured such that the flange bolts 9 extend through the flange holes 7 and the second set of bolt holes 39 when the slide blind apparatus 1 is in the second position of FIG. 5.

In the illustrated slide blind apparatus 1, as seen in FIGS. 2 and 3, the right and left working plates 13, 19 include tabs 41 extending from the perimeters 17, 23 thereof between the front faces 15F, 21F and rear faces 15R, 21R thereof. As schematically illustrated in FIG. 3, the joiner member 31 comprises front and rear joiner sheet members 43F, 43R attached to corresponding front and rear sides of the tabs 41. The right handle member 33 similarly comprises front and rear handle sheet members 45F, 45R attached to corresponding front and rear sides of the tabs 41. Similarly the left handle member 35 also comprises front and rear handle sheet members attached to corresponding front and rear sides of the tabs.

The sheets are attached to the tabs by countersunk screws 47 screwed into threaded holes 49 in the tabs 41 such that the heads of the screws 47 are at or below the surface of the sheets. Each tab 41 defines two threaded holes 49 extending therethrough, and the front and rear sheets are attached to each tab 41 by screws 49 threaded into one of the holes 49 from each side of the tab 41.

Thus while the working members 13 and 19 are quite thick and heavy, the joiner sheet members 43F, 43R and handle sheet members 45F, 45R are relatively thin. As the sheet members are not required to resist any pressure when pressurized fluid is present in the conduits 3F, 3R, they need only be strong enough to hold the apparatus 1 together and allow same to be moved between the first and second positions.

The right working member 13 could be much thinner, since same does not have to resist the force of pressurized fluid as does the left working member 19, however it is convenient to make them the same thickness to facilitate tightening the bolts 9 at the connection to the same position regardless of the position of the slide blind apparatus 1.

For example it is contemplated that the working members 13 and 19 might be 2-3 inches thick while the joiner sheet members 43F, 43R and handle sheet members 45F, 45R might be ¼ to ⅜ inch thick.

The weight reduction is considerable, and could be 25%-40% or more. In addition to being easier to maneuver, the slide blind apparatus 1 of the present invention is more economical to ship, and can be packed in a more convenient package or a number of lighter packages, with the joiner and handle members removed, and then easily assembled on site.

To facilitate maneuvering the slide blind apparatus 1, the illustrated right and left handle members 33, 35 each define a handle aperture 51, which is convenient for attachment of a cable, chain or the like. The handle aperture 51 is defined by corresponding apertures in the front and rear handle sheet members 45F, 45R, and a bushing 53 fixed between the front and rear handle sheet members.

The slide blind apparatus 1 of the present invention can be adapted for use on a variety of slide blind devices however the illustrated slide blind apparatus 1 is shown using a slide blind such as that disclosed in U.S. Pat. No. 7,841,365 to Vetter where a pair of upper flange bolts 59 extend through flange holes 7 above the joiner member 31, and a pair of lower flange bolts 61 extend through flange holes 7 below the joiner member 31, such that the slide blind apparatus 1 can slide from the first position to the second position when the upper and lower flange bolts 59, 61 are in place in the flange holes.

The right handle member 33 is configured such that hook portions 63 thereof bear against the right upper flange bolt 59R and the right lower flange bolt 61R when the slide blind apparatus 1 is in the first position shown in FIG. 6. Similarly hook portions 65 of the left handle member 35 bear against the left upper flange bolt 59L and the left lower flange bolt 61L when the slide blind apparatus 1 is in the second position shown in FIG. 5.

When the slide blind apparatus 1 is moved to either the first or second position, all the flange bolts 9 are removed except the pair of upper flange bolts 59 and the pair of lower flange bolts 61, which are merely loosened so that the slide blind apparatus 1 can slide between the flanges 5F, 5R. Moving the slide blind apparatus 1 to the left until the hook portions 63 of the right working member 33 contact the right upper and lower flange bolts 59R, 61R aligns the first set of bolt holes 37 with the corresponding flange holes 7, so that the flange bolts 9 can be easily re-inserted with the slide blind apparatus 1 in the first position of FIG. 6.

Similarly moving the slide blind apparatus 1 to the right until the hook portions 65 of the left working member 35 contact the left upper and lower flange bolts 59L, 61L aligns the second set of bolt holes 39 with the corresponding flange holes 7, so that the flange bolts 9 can be easily re-inserted with the slide blind apparatus 1 in the second position of FIG. 5.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A slide blind apparatus for controlling flow through conduits at a flanged connection comprising a front conduit and a front flange mounted to an end thereof, a rear conduit and a rear flange mounted to an end thereof, corresponding flange holes through each of the front and rear flanges, and flange bolts extending through the flange holes operative to draw the front and rear flanges toward each other, the slide blind apparatus comprising:

a right working plate configured such that front and rear faces of the right working plate are sealed against corresponding front and rear flanges and a perimeter of the right working plate is adjacent to an inner side of the flange bolts when the slide blind apparatus is in a first position;

a left working plate configured such that front and rear faces of the left working plate are sealed against corresponding front and rear flanges and a perimeter of the left working plate is adjacent to an inner side of the flange bolts when the slide blind apparatus is in a second position;

a central joiner member fixed to the right and left working plates with removable fasters such that the central joiner member can be removed from the right and left working plates, the joiner member having a thickness less than the thickness of the right and left working plates;

a right handle member attached to the right working plate and extending in a direction opposite the joiner member;

a left handle member attached to the left working plate and extending in a direction opposite the joiner member;

wherein at least the joiner member defines a first set of bolt holes configured such that the flange bolts extend through the flange holes and the first set of bolt holes when the slide blind apparatus is in the first position;

wherein at least the joiner member defines a second set of bolt holes configured such that the flange bolts extend through the flange holes and the second set of bolt holes when the slide blind apparatus is in the second position; and wherein the right and left working plates include tabs extending from the perimeters thereof between the front and rear faces thereof, and wherein the joiner member comprises front and rear joiner sheet members attached to corresponding front and rear sides of the tabs.

2. The apparatus of claim 1 wherein the right and left handle members comprise front and rear handle sheet members attached to corresponding front and rear sides of the tabs.

3. The apparatus of claim 2 wherein at least one of the right and left handle members defines a handle aperture.

4. The apparatus of claim 3 wherein the handle aperture is defined by corresponding apertures in the front and rear handle sheet members of the at least one of the right and left handle members, and a bushing fixed between the front and rear handle sheet members.

\* \* \* \* \*

UNITED STATES PATENT AND TRADEMARK OFFICE
CERTIFICATE OF CORRECTION

PATENT NO. : 9,121,508 B2
APPLICATION NO. : 14/122015
DATED : September 1, 2015
INVENTOR(S) : Glen Joki Page 1 of 1

It is certified that error appears in the above-identified patent and that said Letters Patent is hereby corrected as shown below:

Title Page Item (57) Abstract, delete "plates" and insert --plate--

In the Specification

Col. 1, lines 7-9, delete "PCT/FR2011/050227, filed Feb. 4, 2011, which claims priority from FR Application No. 1058956 filed Oct. 29, 2010" and insert --PCT/CA2011/000615, filed May 31, 2011--

Col. 1, line 43, delete "plate" and insert --plates--

Col. 3, line 38, delete "is"

Signed and Sealed this
Fifth Day of July, 2016

Michelle K. Lee
*Director of the United States Patent and Trademark Office*